United States Patent Office 3,350,809
Patented Nov. 7, 1967

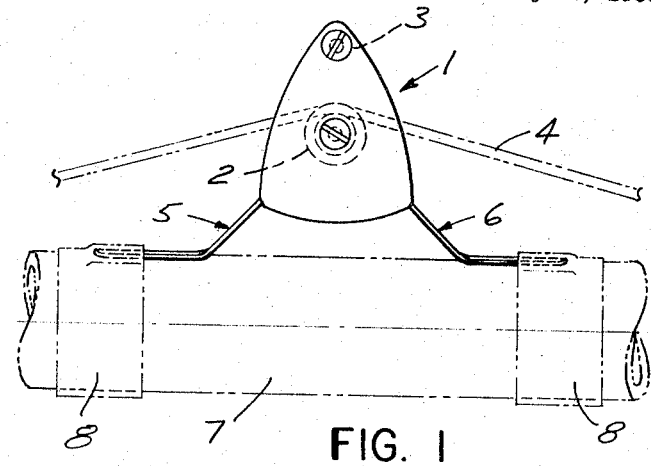
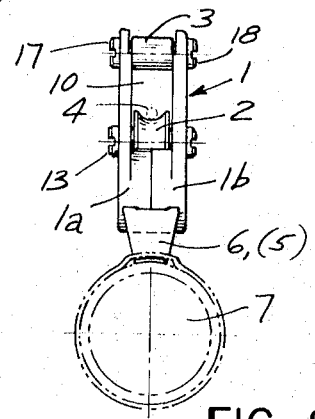
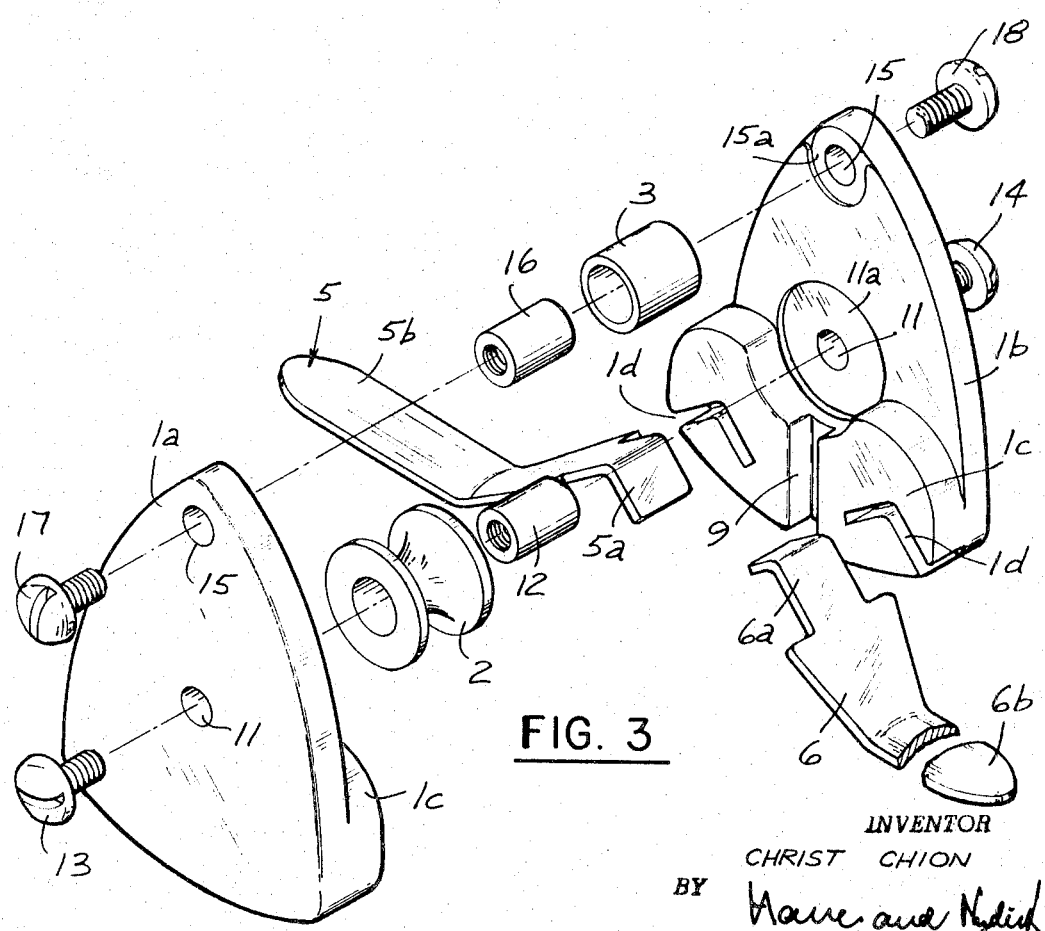

3,350,809
ROLLER GUIDE FOR A FISHING ROD
Christ Chion, Plainview, N.Y., assignor to Allan
Manufacturing Co., Hicksville, N.Y.
Filed May 10, 1965, Ser. No. 454,463
9 Claims. (Cl. 43—24)

ABSTRACT OF THE DISCLOSURE

A roller guide for a fishing rod which can be disassembled for replacement or cleaning of the roller of the guide without detaching the legs of the guide from the fishing rod.

The present invention relates to a roller guide for mounting on a fishing rod to guide the line, and more particularly, to a roller guide which is secured to the rod by wrapping a suitable binding about the legs of the guide and the rod.

Roller guides of the general kind above referred to are subjected to rather severe stresses and strains due to the pull on the line during fishing, especially since the pulling force acting upon the line tends to vary sharply. The guides are also exposed to the corrosive action of water, especially when the rod is used for salt water fishing, and to the deleterious action of sand and other foreign bodies unavoidably penetrating into the roller guide. As a result, the roller which is a principal operative component of the guide is not infrequently damaged or at least ceases to rotate freely due to corrosion, the presence of sand, etc.

With roller guides as heretofore known, replacement of a defective roller is not possible, at least not practical, and the entire guide must be replaced. Such replacement is not only rather costly but also requires cutting of the existing binding and wrapping of a new binding to secure the new guide to the rod. Roller guides as now known also do not conveniently permit a thorough cleaning of a jammed guide without detaching the same from the rod.

Binding of a new or a cleaned roller guide to the rod is rather time consuming and delicate work as it must be carried out very carefully to secure the guide safely in position in view of the sharp pulls to which the same may be subjected when in use.

It is an object of the invention to provide a novel and improved roller guide of the general kind above referred to, the roller or other components of which can be removed for replacement or cleaning without detachment of the entire guide from the rod by cutting the binding securing the legs of the guide to the rod.

It is also an object of the invention to provide a novel and improved roller guide of the general kind above referred to which can be disassembled to provide free access to the roller and other components of the guide for cleaning or replacement, if necessary, while leaving the legs of the guide in situ.

A more specific object of the invention is to provide a novel and improved roller guide of the general kind above referred to which due to being made of several parts that can be readily disassembled and reassembled by the ultimate user, permits a free choice of the material used for each of the components of the guide. This has the advantage that the main body of the guide supporting the legs, the roller and a rotatable guide pin coacting with the roller may be made of a material which is practically indestructible in that it is empervious to water and has no tendency to crack, peel, chip or blister. The legs which may be contoured, the roller and the guide pin coacting with the roller may be made of stainless steel. All soldering joints may be avoided.

Other and further objects, features and advantages of the invention which will be pointed out hereinafter will be set forth in the appended claims forming part of the application.

In the accompanying drawing a preferred embodiment of the invention is shown by way of illustration and not by way of limitation.

In the drawing:

FIG. 1 is a side view of an assembled roller guide attached to a fishing rod;

FIG. 2 is a side view of FIG. 1; and

FIG. 3 is an exploded perspective view of the roller guide.

Referring now to the figures in detail, the roller guide comprises a main or support body 1 in which are rotatably supported a roller 2 and a rotatable guide pin 3 coacting with the roller to guide a fishing line 4 therebetween. Legs 5 and 6 extend from opposite sides of support body 1 in aligned relationship. The free ends of the legs are secured to a fishing rod 7 in a conventional manner by suitable bindings 8. The manner of attachment of the legs to the rod does not constitute part of the invention and is hence not described and illustrated in detail.

Turning now to FIG. 3, the main or support member 1 comprises two complementary and preferably identical parts 1a and 1b. Body halves 1a and 1b may be molded of suitable plastic. While various suitable plastics are known for the purpose, a plastic should be selected which is not appreciably affected by the action of water, especially salt water, and which will not crack, peel, chip or blister even when subjected to severe operating conditions. Polycarbonate thermo-plastic materials are found to be particularly advantageous. A pure white porcelain-like body which is practically indestructible can be molded from such material which also has a high impact strength and very great resistance to temperature extremes. Materials particularly suitable for the purpose are known under the trademark Lexon.

Body halves 1a and 1b are generally plate shaped and each half has on one of its sides a raised plane portion 1c. When the two raised portions are placed in abutment, a gap or slot 10 is defined therebetween.

Legs 5 and 6 are held in the position shown in FIG. 1 by clamping ends of the two legs betwen halves 1a and 1b when the guide is assembled as shown in FIGS. 1 and 2. More specifically, a convenient and safe mounting of the legs is obtained by providing in each raised portion 1c a pair of slots 1d which are engaged by leg portions 5a and 6a thereby retaining the legs between the two body halves when the same are assembled. To prevent pulling of the legs out of the slots, the same have preferably a nonrectilinear configuration, for instance, an angular configuration as shown. Leg portions 5a and 6a are shaped to match the slots. The leg portions 5b and 6b which are secured to rod 7 are preferably contourned as it is indicated in the figures. While various materials are suitable for the legs, it has been found that the use of stainless steel is particularly advantageous. A drain slot 9 preferably traverses each of raised portions 1c.

Each of body halves 1a and 1b has a transverse hole 11 therethrough. The inside of the halves are preferably countersunk or recessed as shown at 11a. Holes 11 serve to mount bearings for roller 2. The roller is rotatably seated on an internally threaded bearing sleeve 12 which extends across slot 10 and is secured in position by suitable fastening means such as screw bolts 13 and 14 screwed into sleeve 12 through holes 11 from the outside of body halves 1a and 1b. As it is evident, tightening of bolts 13 and 14 will secure the two body halves in the position shown in FIG. 2 thereby also holding the roller and the legs in the required operational positions.

The body halves have a second hole 15 therethrough which is countersunk or recessed at 15a. Holes 15 serve to mount a second internally threaded bearing sleeve 16 on which guide pin 3 proper coacting with roller 2 is rotatably seated. Sleeve 16 is secured in position by fastening means such as bolts 17 and 18 screwed into sleeve 16 through holes 15.

The assembly of the roller guide is readily apparent from the previous description and the figures. Let it be assumed that the guide is assembled and secured on rod 7 and that it is desired to disassemble the guide either for replacement or cleaning of the parts of the guide. To effect such disassembly, the user merely needs to remove one set of bolts, that is, either bolts 13 and 17 or bolts 14 and 18. The guide can then be taken apart while leaving legs 5 and 6 in position on the rod. Reassembly can be effected in an equally simple manner.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A roller guide for a fishing rod, said guide comprising a support member composed of two substantially parallel disposed plates, a pair of legs at one end between said plates and protruding therefrom at two spaced apart edges of the plates, said legs being adapted to be fixedly secured to the fishing rod and detachably secured to said plates, said plates defining therebetween a space, a roller detachably supported in said space between said plates, said roller being rotatable about an axis transverse of said plates and said space, a guide pin detachably supported by said plates, and extending across the space therebetween parallel to the rotational axis of said roller, mounting means for said roller, mounting means for said guide pin, and releasable fastening means extending through said plates into engagement with the roller and guide pin mounting means and releasably securing said plates in said mutual parallel position thereby holding the legs, the roller and the guide pin in the aforesaid positions between the plates.

2. A roller guide for a fishing rod according to claim 1 and further comprising a bearing sleeve within said space extending transversely across the same, said fastening means extending through said plates into the respective end of the bearing sleeve for securing the same, and said roller being rotatably supported on said sleeve.

3. A roller guide for a fishing rod, said guide comprising a support member composed of two substantially parallel disposed plates, a pair of legs extending at one end between said plates and protruding at two opposite edges of the plates, said legs being adapted to be fixedly secured to the fishing rod and detachably secured to said plates, said plates defining therebetween a space extending in a plane substantially parallel to the plates, a bearing sleeve disposed within the space transversely across the same, a pair of first releasable fastening means each extending through one of said plates from the outer side thereof and into the respective end of the bearing sleeve and securing the two plates together in said mutual parallel position thereby holding said legs and said sleeve in position between said plates, a roller rotatably supported on said sleeve, a guide pin within said space extending across the same parallel to the rotational axis of the roller, and a pair of second releasable fastening means each extending through one of said plates from the outer side thereof and into the respective end of the guide pin.

4. A roller guide according to claim 3, wherein said bearing sleeve is internally threaded and each of said first fastening means is in the form of a screw bolt screwed through the respective plate shaped part into the bearing sleeve.

5. A roller guide according to claim 3, wherein said guide pin comprises an internally threaded sleeve and each of said second fastening means is in the form of a screw bolt screwed through the respective plate shaped part into said internally threaded sleeve.

6. A roller guide according to claim 5, wherein said guide pin further comprises an outer guide sleeve rotatably seated on said threaded sleeve.

7. A roller guide according to claim 1, wherein each of said plates has a raised portion on one of its face sides, said raised portions abutting against each other in said secured-together position of the plates.

8. A guide roller according to claim 7, wherein at least one of said raised portions includes a pair of slots in its side facing the other raised portion, one end portion of each leg engaging one of said slots in the raised portions.

9. A roller guide according to claim 8, wherein each of said slots in said raised portions has a non-rectilinear configuration, the engaging end portion of the respective leg having a configuration matching the configuration of the respective slot to secure the respective leg in the same against lengthwise displacement.

References Cited

UNITED STATES PATENTS

| | | | |
|---|---|---|---|
| 152,270 | 6/1874 | Bird. | |
| 1,835,310 | 12/1931 | Kline et al. | 43—24 |
| 2,199,861 | 5/1940 | Sebrean et al. | 43—24 |
| 2,878,608 | 3/1959 | O'Brien | 43—24 |

SAMUEL KOREN, *Primary Examiner.*

D. J. LEACH, *Assistant Examiner.*